Jan. 26, 1971 C. A. METZGER ET AL 3,558,437
RADIOACTIVE ISOTOPE DISTILLATION SYSTEM FOR
RECOVERING WATER FROM WASTE IN A SPACECRAFT
Filed June 11, 1969 5 Sheets-Sheet 4
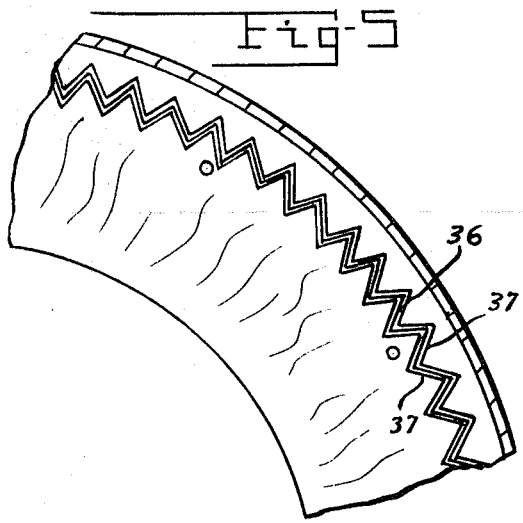
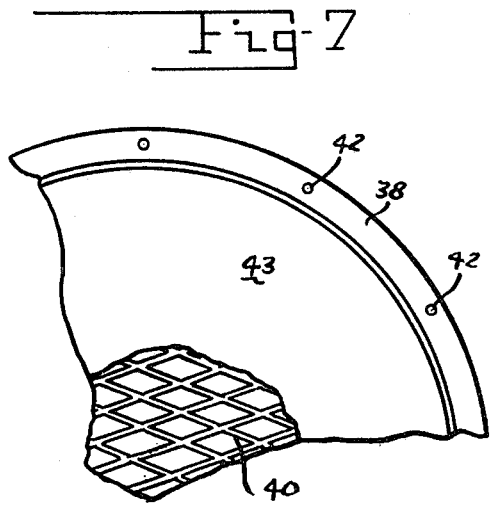
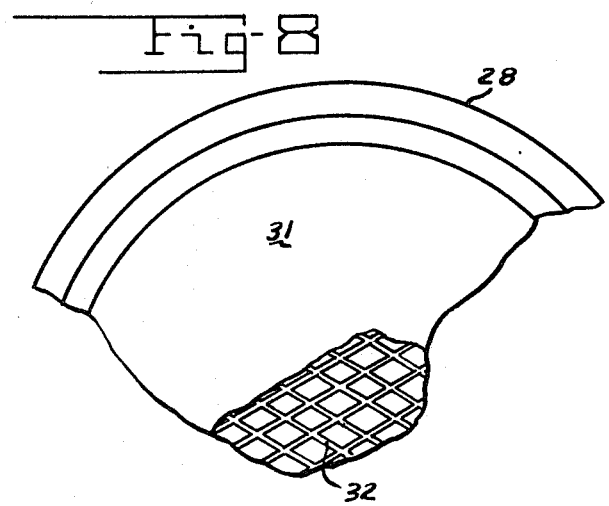
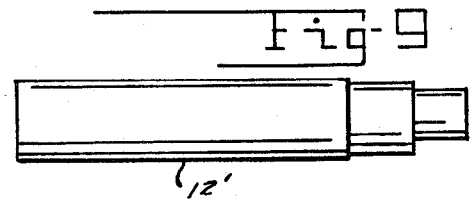
INVENTORS
COURTNEY A. METZGER
ALBERT B. HEARLD
BY Harry A. Herbert Jr.
Herbert H. Brown
ATTORNEYS INVENTORS
COURTNEY A. METZGER
ALBERT B. HEARLD
BY Harry A. Herbert Jr.
Herbert H. Brown
ATTORNEYS United States Patent Office 3,558,437
Patented Jan. 26, 1971

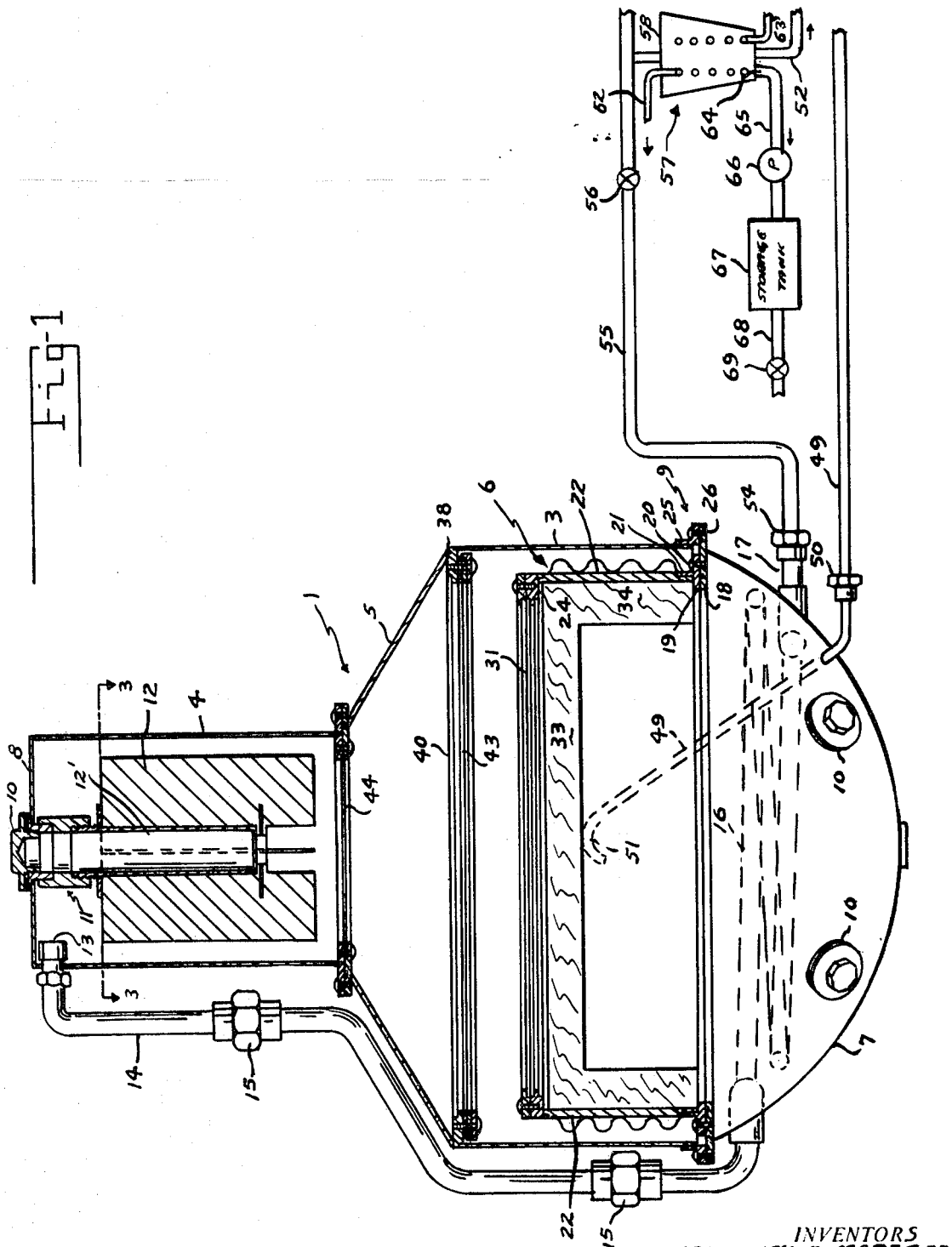

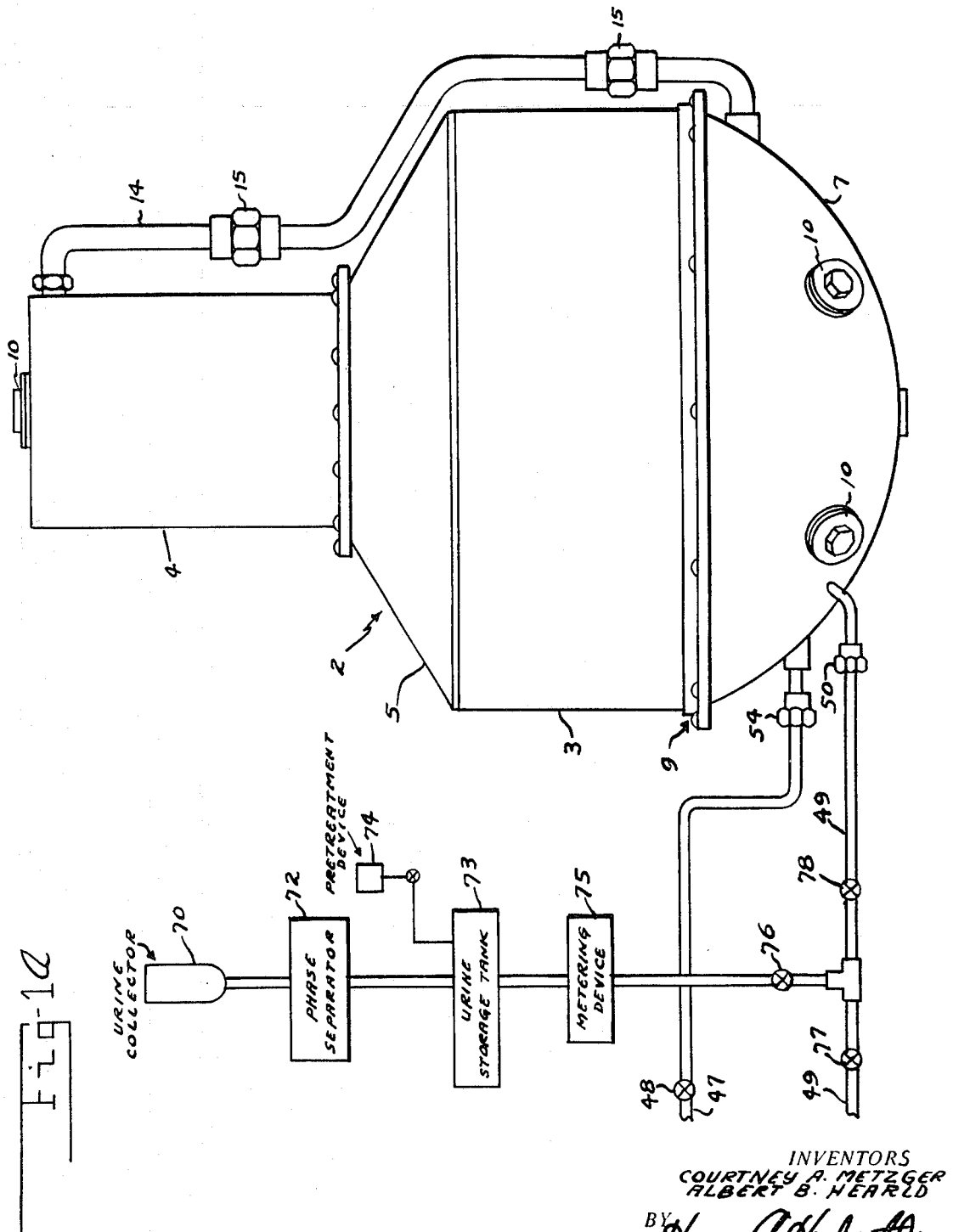

3,558,437
RADIOACTIVE ISOTOPE DISTILLATION SYSTEM FOR RECOVERING WATER FROM WASTE IN A SPACECRAFT
Courtney A. Metzger, Springfield, and Albert B. Hearld, Dayton, Ohio, assignors to the United States of America as represented by the Secretary of the Air Force
Filed June 11, 1969, Ser. No. 832,114
Int. Cl. B01d 3/00
U.S. Cl. 202—200                                    10 Claims

ABSTRACT OF THE DISCLOSURE

There is disclosed an improved system for obtaining potable water from human waste and involving two evaporators having a waste inlet in common and a vapor outlet in common but segregated functionally by suitably positioned control valves. Each evaporator is of cylindrical shape, formed of several compartments of different diameters, two of which are secured together by a conical housing. The lowermost compartment is hemispherical in shape and is detachably secured to the adjacent compartment. There are four isotopes in the lowermost compartment, also a single isotope in the uppermost compartment. The waste material is pumped into the lowermost compartment where it is heated and the vapor is forced to pass through, in succession, a heavy layer of "wicking" material, also a pair of horizontally disposed filters, in addition to a circumferential filter. Upon reaching the uppermost compartment, the vapor is heated by the single isotope enclosed in a casing from which a number of vanes radiate to distribute the heat. The space between the vanes is filled with an oxidizing catalyst. The vapor is fed into a coiled pipe located in the lowermost compartment where it gives up its heat to the surrounding waste material. The vapor is then conducted through a water cooled condenser, and finally to a storage tank for consumption. The hemispherical compartment receives the semi-solid precipitate and is adapted to be cleaned by the astronaut by removing the same at the detachable connection, after a "switch over" to the other evaporator has been effected by the various valves.

BACKGROUND OF THE INVENTION

Inter planetary missions of space craft may consume several days or even weeks and these vehicles generally accommodate two or three astronauts. The greatest necessity on board is an adequate supply of water. It is impossible to carry enough water or even keep the supply fresh over these long periods of time. The tremendous weight of the water would absolutely forbid this possibility. The only feasible way to avoid this water overload is to convert the body fluid of the astronauts into potable liquid, suitable even for drinking and, if necessary, use this water with proper treatment over and over again throughout the mission. In the earlier form of evaporator, such as is shown and described in application Ser. No. 695,343 in the name of Courtney A. Metzger et al., the source of heat was derived in any convenient manner, such as a heater reactor, a space radiator which derives its energy from the sun, or from electrical equipment on board. However, it was found that these sources are not always reliable, are not of sufficient intensity or continuity to provide the proper degree of vaporization by which to obtain an adequate supply of heat. The use of an isotope as a heat source has also been mentioned. But, in practice, after further development, it was found that special precautions in the use of this highly reactive material would have to be undertaken, such as a new form of evaporator made to accommodate more than one isotope and this would permit the simultaneous use of a number of smaller unit isotopes, each having a manageable power. Apart from the problem of obtaining an adequate and reliable source of heat for the distillation process, the major difficulty appears to be in the disposal of the solid or the semi-solid mass precipitated during distillation. Unless this material is immediately removed, the filters would become clogged and further operation would be stopped with consequent loss of the life sustaining water. It is imperative, therefore, that an improved recovery system be made available in which the clogging effect of the precipitates be materially reduced and completely ended, if possible, so that the distillation process can be prolonged throughout a considerably extended mission.

SUMMARY OF THE INVENTION

An object of the invention is to provide an improved waste evaporator system, especially for space vehicles which lends itself to the use of isotopes in the procurement of potable water from body waste.

Another object is to provide an improved waste evaporator system in which the solids and other foreign matter separated from the raw material can be readily removed from the system to permit the latter to continue its operation with little or no delay.

Still another object is to provide an improved waste evaporator system in which the solids and other foreign matter separated from the human waste during distillation can be removed from the distillation device without dismantling the entire sysem or affecting the continued operation of the system.

These objects are obtained, in brief, by providing an improved system of employing more than one evaporator connected to a raw material inlet and a potable liquid outlet, common to both evaporators, and instant switching can be made possible, from one evaporator to the other and back to the original evaporator. The evaporators are so constructed that after switchover, the first evaporator can be taken apart by the astronaut and the semi-solid precipitate be quickly removed to make the evaporator ready and immediately available to continue the distillation function when the common inlet and outlet conduits are switched back to their original position. In another aspect, the invention contemplates the use of evaporators of an improved character, and in which each evaporator can accommodate three or more isotopes of moderate and easily handled size and forming the evaporator in at least two parts which are bolted together along a circumferential parting line. The evaporator portion above the parting line represents the position where the distillation takes place and the portion below represents where the precipitate is formed. The evaporator can be dismantled at the parting line to remove the precipitate and the clean lower portion can be installed and bolted to the distillation portion ready for immediate operation.

Other objects and features will be apparent as the specification is perused in connection with the accompanying drawings:

FIGS. 1 and 1a when arranged end to end present a double unit evaporator system in which the units are interrelated to operate without interruption over long missions. The unit at the left is shown partly in cross-section and partly in elevation.

FIG. 5 represents an enlarged fragmentary view showing the details of the filter illustrated in FIG. 4.

FIG. 7 illustrates a fragmentary view of the filter cloth and one of the expanded metal discs extending across the base of the conical housing of each evaporator unit.

FIG. 8 is similarly a fragmentary view of the filter and its expanded metal support which extends across the top of the lower cylinder within the base portion of the evaporator.

FIG. 9 is a view, in elevation, of one of the isotopes which are employed to furnish heat in both evaporators.

Figure 2:
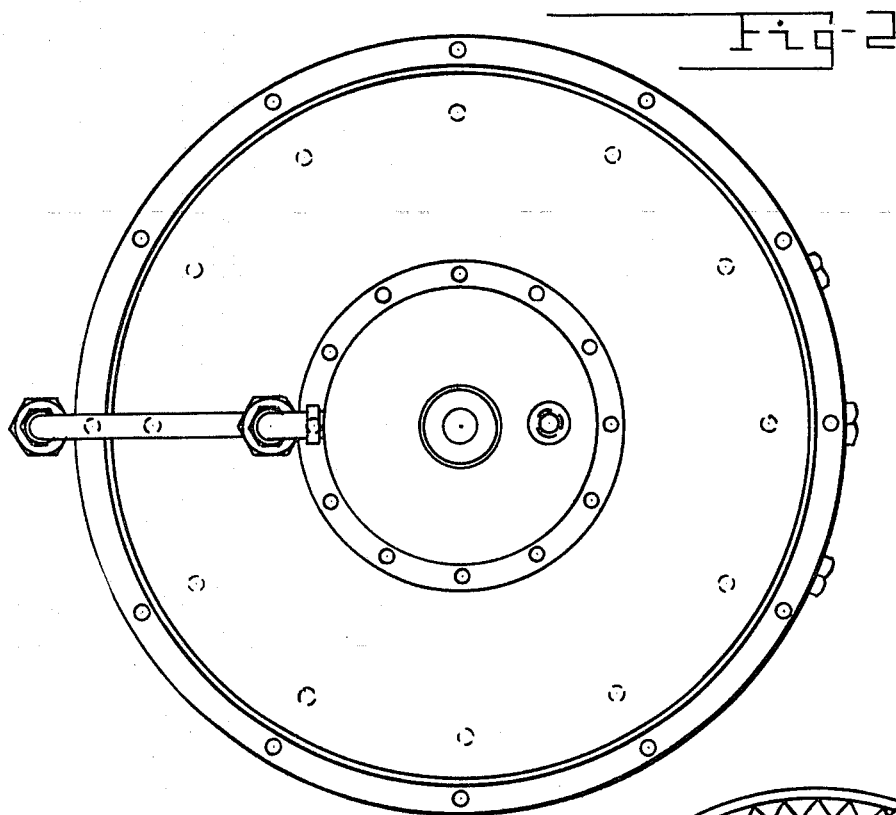
FIG. 2 is a plan view of the improved evaporator.

Referring more particularly to FIGS. 1 and 1a, reference characters 1 and 2 designate generally a pair of evaporators of an improved character, connected together through conduits and valves to a common input and a common output system. Each evaporator is of circular shape, in order to more easily fit into the close confines of a space capsule. It is formed of outer cylinders 3 and 4 joined together by a conical housing 5. There is a cylindrical member designated generally at 6 arranged concentrically within the cylinder 3. The outer casing members are made preferably of stainless steel and about 3/16 to 1/8 inch thick. The lower cylinder 3 has detachably secured thereto a hemispherical compartment 7, which receives the human waste in liquid or semi-liquid form and heats the same to the vapor point as will be described hereinafter. The upper end of the compartment 4 is closed by a wall 8. The cylindrical members 3, 5, 6 and 7 are hermetically joined together as will be explained hereinafter, and the compartment 3 is joined to the lowermost compartment 7 by a joint, indicated generally at 9 which is readily detachable for removing one compartment from the other. Within the compartment 7, there are four openings having screw threads (not shown) for receiving threaded plugs 10 similar to those shown at 11 at the upper end of the compartment 4. These plugs, including plug 11 are for the purpose of securing radio-isotopes 12 at suitable positions within the compartments.

Figure 3:
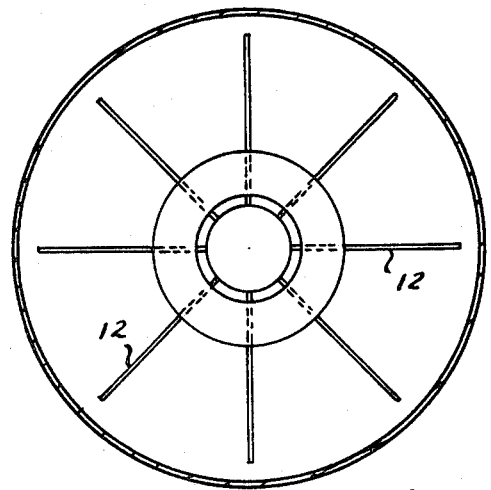
FIG. 3 illustrates a plan view of the heat radiator, as shown at line 3—3 in FIG. 1, and looking in the direction of the arrows.
Figure 4:
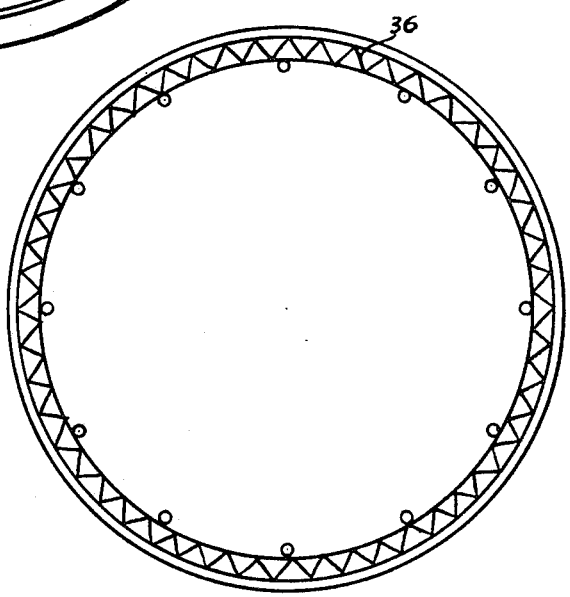
FIG. 4 depicts, in plan, a circumferential filter of an improved pleated type for separated semi-solids from the vapor.

FIG. 9 shows in elevation one of these isotope units which may be of the plutonium type (238 $PuO_2$), procured from the Atomic Energy Commission. The larger diameter portion as shown in FIG. 9 is about an inch and the length of this portion is about four inches. The isotope members are presented through the lowermost chamber 7 at spaced positions and project inwardly in a radial direction, i.e., pointing toward the center of the partial sphere. They are detachably held within cylindrical sockets of any suitable and well known type, the outer opening of which is closed by a large nut 10. By removing the latter, it is readily possible to insert or retract an isotope unit which is extremely hot and must be handled with great care. At the upper compartment 4, the isotope and the socket 11 extend along the central axis. In order effectively to heat the vapor at the top compartment 4, there is provided a large number of flat vanes 12 (as shown) which extend equal distances outward from the isotope socket and is secured thereto as seen in FIG. 3. These vanes preferably extend downwardly below the end of the isotope and its socket member. The vanes may be approximately 3/32 of an inch thick and made of stainless steel.

At a position between the upper edge of the radiating vanes and the top wall 8, there is an entrance 13 of a conduit 14, connected to couplings 15 to a metal coil of one or more turns positioned within the lowermost compartment 7. The conduit leaves the compartment at the point 17 and the function of this member, including the coil 16, will be described hereinafter.

At the circumferential joint 9, the compartment 7 is provided with an integral horizontal flange 18 of considerable width to which is screwed, as at 19, an inner flat ring 20 provided with twelve equidistantly spaced uprights 21. These uprights serve as anchor posts for a number of rods 22, which extend for a considerable distance into the compartment 3 as seen more clearly in FIG. 6. The upper outer edges of the rods 22 are notched as indicated at 23 in order to receive a ring member 24 having a downwardly extending lip at its outer edge which fits tightly around the notched portions of the rod. The member may be welded if desired at the points of contact.

The flange 18, in addition to carrying the posts 22, is also provided with a series of small angle iron pieces 25, which are screwed as at 26. These pieces are welded to the cylinder 3. Thus, by removing the screws 26, the bottom compartment 7, also the rods 22 can be dropped downwardly away from the compartment 3, assuming that the couplings 15, also the coupling at the point of exit of the conduit 17 will have been loosened. The inside top surface of the ring 24 is recessed as at 27 and there is a ring 28, the inside bottom surface of which is recessed as at 29 to coincide with the lower recess. The ring 28 is screwed as at 30 to the lower ring. The rings 24, 28, serve as clamps for a filter cloth 31. This cloth may be constituted of woven Fiberglas or strands with "Teflon" and having five micron openings. A cloth of this character is procurable on the open market under the name of Pallflex TV 20-A-60 and is characterized by restraining the passage of substantially all the contaminating material in the vapor on its way to the upper portion of the evaporator. The filter cloth member is affixed in a stretched condition and is held in this condition by means of the two rings 24, 28 and the screws 30 which are equally spaced about the outer boundary of the rings. Within the confines bounded by the lower surface of the ring 24 and the inner surfaces of the rods 22, there is a so-called "wicking" member formed of a circular portion 33 and a downwardly extending cylindrical portion 34 made of stainless steel wool sponge. This material is readily procurable on the market under the name stated, and is of considerable thickness both in the horizontal and vertical directions. The purpose of the wool sponge or wicking material is to allow the vapor to readily pass through but to keep the liquid from contacting the filter cloth 31 or the circular membrane which will now be described.

The membrane 36 is shown more clearly in FIG. 5, as enlarged, and is constituted of a pleated and fairly stiff member conforming generally to a cylinder and set on edge between the wicking material and the interior surface of the cylinder 3. It is the same approximate length as the distance between the lower surface of the ring 24 and the upper surface of the ring 19 on which it rests. The membrane has small openings and is formed of "Teflon" coated Fiberglas with the width of the pleats being such as to give the membrane, as a whole, sufficient width in the horizontal direction as substantially to fill the space between the circumferential surface 34 of the wicking material and the inside surface of the casing cylindrical member 3. The membrane is protected on the inside and outside surfaces by fine screens made of stainless steel. These screens are closely attached to the pleats of the membrane and thus are themselves pleated so as to follow the zig-zag shape of the membrane and protect the sensitivity of the Teflon coating from the impact of solid material. These screens are shown in FIG. 5 and designated at 37. Thus, the filter cloth 31 and the membrane 36 together with its screen accessory 37 permit only the vapor to pass through in the vertical and circumferential direction to reach the upper end of the evaporator.

Figure 6:
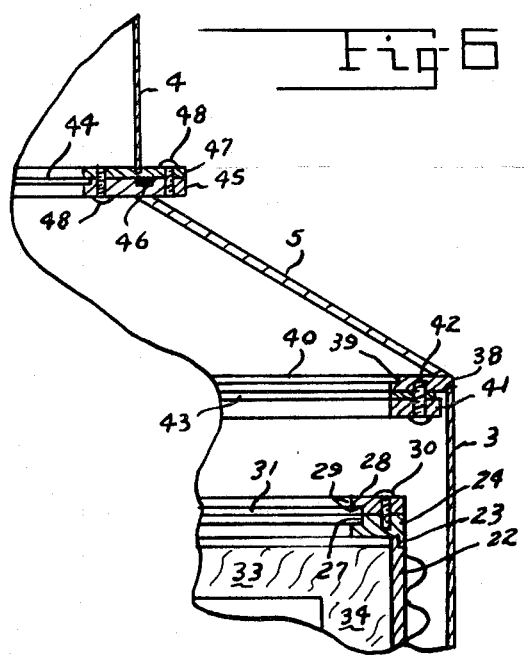
FIG. 6 is an enlarged fragmentary view in section of the corner joints between the vertical and horizontal members of one of the evaporator units.

The conical portion 5 of the casing is connected to the cylindrical portion 3 by being secured as by welding to opposite sides of a flat ring 38, as seen in FIG. 6. The inner edge of the ring is recessed as at 39 to receive a disc 40 formed as a grating of flattened criss-cross wires as shown in FIG. 7. There is a second ring 41 secured to the first ring by a number of screws 42 equidistantly spaced about the periphery. Clamped between the rings 38, 41, there is a filter cloth 43 similar to the element 31 described hereinbefore, the cloth being stretched in place and held securely by the tightening screws 42.

At the junction between the conical member 5 and the uppermost cylinder 4, there is a retainer disc 44 as is also seen in FIG. 6. For supporting the disc, the member 5 is provided with a wide integral flange 45 which may be welded to the member. The flange is notched at the inner edge to hold the disc snugly in place. A groove 46 is also provided in the flange 45 for holding a flattened O-ring in place for sealing purposes. Directly above the flange 45 and contiguous therewith there is another wide ring 47 of the same width as the lower flange, and these members are joined together by opposite directed screws 48. A narrow circular groove is provided in the ring member 47 which snugly receives the lower edge of the uppermost cylinder 4. The latter may be welded in place if desired. The space within the cylinder or housing 4 including that between the vanes 12 is filled nearly to the top by granules of catalytic oxidization material of any well known and suitable type, preferably that sold on the market under the name of "Ardox," manufactured by Arde, Inc. of New Jersey. The disc 44 is evenly perforated, the openings being slightly smaller than the size of the granules of the oxidizer in order to readily pass the vapor and simultaneously oxidize the vapor on its way through the compartment.

It has been pointed out that the vapor in the housing 4 is additionally heated by the use of a radioisotope contained within the socket 11 and the heat of which is radiated by vanes 12. The heated vapor is then forced by a pump which will be referred to hereinafter, to the exit opening 13 and thence through the entire length of the external conduit 14 into a coil 16 which is located in the bowl shaped compartment at the bottom of the evaporator. This vapor having been heated by the isotope can now give out considerable heat to the liquid waste material that is simultaneously being heated by the four isotopes at the bottom of the evaporator. By employing the heat obtained by the vapor from the uppermost isotope to assist in heating the liquid waste, less heating load is placed upon the four isotopes. Thus, the waste material can be heated to a higher temperature for a given vacuum, or if desired, the vacuum can be reduced and still obtain the proper distillation temperature of the waste material.

Figure 10:
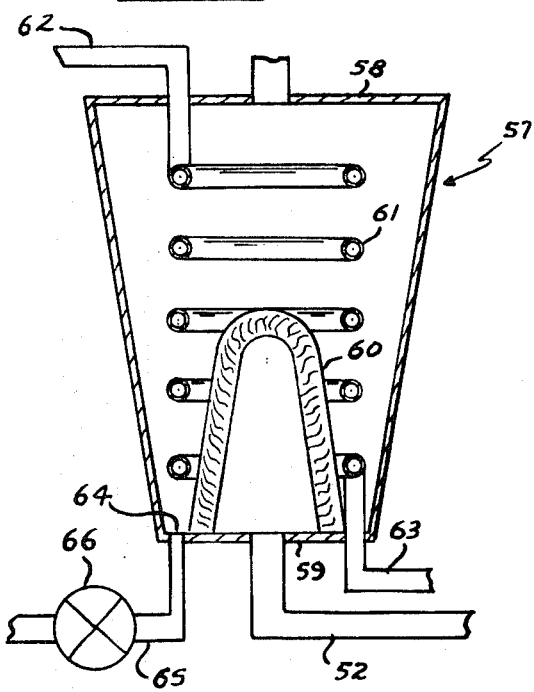
FIG. 10 represents an enlarged sectional showing of the condenser which is common to both units for reducing the distilled vapor to a potable liquid.

The waste material is fed from a source, explained hereinafter, into the lowermost or bowl shaped compartment 7 to a pipe 49 having a detachable coupling 50. The pipe extends at an angle within the compartment and terminates in a goose neck 51 which directs the raw material to the bottom of the compartment. The interior of the evaporator is under a vacuum throughout in order to facilitate the distillation process. The vacuum is supplied through a pipe 52 which enters the bottom of the condenser. The pipe may be connetcted to a vacuum pump of any suitable and well known type (not shown). In the case of a space vehicle traveling in orbit, a pipe reaching out into space and provided with a control valve (not shown) would serve as a suitable source of vacuum. We have obtained particularly good results in maintaining a vacuum of about 49 millimeters of mercury and an optimum vapor temperature of about 100 degrees F. The vapor leaves the evaporator at the point 17 and passes through the coupling 54, the conduit 55 and valve 56 into a condenser indicated generally at 57 (FIG. 1). While the condenser, shown in FIG. 10, may take on various forms, we prefer the type in which the casing is shaped as an inverted frustrum of a cone. The latter is closed at the ends by means of the plates 58 and 59 except for the various conduits entering or leaving the condenser. There is secured to the bottom 59 a pair of basket woven elements, spaced apart and taking the form of an upstanding cone member 60 with a rounded top. A hydrophobic material of any suitable and well known type is contained between the woven sides, the purpose of the material being to allow ready passage of air or gas but preventing any passage of water. Surrounding the cone shaped member, there is a large coiled conduit 61, the outlet of which is represented by a pipe 62 passing through the upper closure member and the inlet pipe being shown at 63 passing through the lower closure member. The vapor is led into the condenser at the top and is then condensed down to liquid by passing cold water through the coiled pipe 61 upwardly to the outlet pipe 62. The coolant may be supplied from a jacket surrounding the evaporator (not shown) of an air conditioning unit within the space vehicle and given the proper pressure by means of a condenser pump (not shown) of any suitable and well known type. In a vehicle traveling through orbital space, a continuous supply of cold water can be obtained by placing a coil containing water overboard, which coil forms part of a closed circuitory system and is branched out through a valve (not shown) to the condenser. The vapor as it is condensed to a liquid flows through the outlet 64 and a conduit 65 where it passes through a pump 66 of any suitable and well known type to a storage tank 67. A dispensing pipe 68 and a valve 69 may be taken from the storage tank.

The source of the waste material is indicated in FIG. 1a and may comprise a tank 70 which is adapted to receive the waste material from the body of the astronauts or from any other source. From the tank 70 the material passes through a phase separator 72 which is a well known item in air space equipment design and its purpose is to separate air from the waste material. From the phase separator the material passes into a temporary storage tank 73 to which is preferably connected a so-called "pretreatment device" 74 together with its valves for introducing to the contents of the tank, 2.5 ml./liter of material of a solution formed of four parts sulphuric acid and one part chromium trioxide and four parts distilled water. This pretreatment step is for the purpose of stabilizing the ammonia and restricts the bacteria. From the temporary storage tank, the material is then metered by the device shown at 75 of any suitable and well known type which determines the proper charge of material for a single evaporator. If the left hand evaporator is to be used, as shown in FIG. 1, the valve 76 is opened and the urine will pass through a valve 77 into the inlet pipe 49 as explained hereinbefore. The valve 78 is closed at this time. On the other hand, if the evaporator shown to the right of the combined FIGS. 1, 1a, is to be used, the valve 76 is opened, also the valve 78. In this case, the valve 77 would be closed so that the waste material would flow through the inlet pipe 49 into the evaporator 2. It will be understood that the construction of the right hand evaporator is the same as the left hand structure so that similar reference characters can be employed to designate similar parts.

As was explained in connection with the structure shown in FIG. 1, the evaporator shown in FIG. 1a also has a detachable joint at 9 so that the lower bowl like compartment can be readily removed from the compartment 3 after the necessary disconnects have been made at the couplings 15, 54 and 50. The use of the two evaporator systems, shown in FIGS. 1 and 1a, was designed to operate 480 man days without the long interruption that would be usually caused by the build-up of residue in an evaporator of an ordinary water recovery system. To eliminate stoppage caused by the residue, it is necessary to close only a few valves, remove the isotope from the catalytic oxidation unit at the top and the four isotopes at the bottom of the unit and place the isotopes in the other of the two evaporators and then open a few valves—an operation requiring less than five minutes. The system can then be operated for another 160 man days. During this period and after the residue is dry in unit 1, the hemispherical portion 7 is removed, placed in a bag and the bag is sealed and stored. A new or cleansed evaporating portion can be installed on the number 1 unit. With the exception of changing the isotopes, the system can now operate for the remaining 320 man days of the mission. The system requires no other servicing until after the space vehicle returns to earth. The isotopes are easy to remove and reinsert in the system with a special tool. The catalytic oxidation unit at the top of the evaporator can be sized for the required length of the mission. Using the vacuum of outer space and the radioisotopes for thermal energy, the reliability of the water recovery system is increased many fold. Also, the energy required to reclaim potable water from waste is decreased from 50 watt-hours per pound of water to approximately 8 watt-hours. Furthermore, the system requires only a minimum of operating parts. The water produced in all tests of the apparatus shown meets the drinking water standards and, for the first time, on long time continuous processing all samples analyzed were bacteria free. The system of using the two evaporators and being able to take them apart, particularly removing the lowermost compartment where the residue has collected so that the appropriation of potable water from human waste can continue night and day over a period of at least three hundred and twenty man days, is believed to satisfy future aerospace requirements in a flight system introducing high quality, potable, bacteria free water from human waste. The recovered product will meet the most rigid requirement standards.

We claim:

1. In combination, an evaporator for obtaining potable liquid from human waste, said evaporator having a plurality of compartments comprising lowermost, uppermost and intermediate compartments, the abutting edges of the compartments being secured together to form the evaporator, the top end of the uppermost compartment being closed and the lowermost compartment being secured to the intermediate compartment by a readily detachable joint, means for introducing the waste material into the lowermost compartment, and means for heating said material up to the distillation temperature, a circumferential filter in the intermediate compartment through which at least a part of the distilled vapor is caused to flow into the uppermost compartment, and a flat filter in the intermediate compartment through which the remaining portion of the vapor is caused to flow, means in the uppermost compartment for heating the filtered vapor, and means for returning the heated vapor to the lowermost compartment to radiate its heat content to the waste material but maintained physically separate therefrom, and means for receiving and condensing the vapor and collecting the same in a storage tank as potable liquid.

2. The combination set forth in claim 1, and in which the first mentioned heating means is constituted of a plurality of isotopes using radioactive material and symmetrically arranged in said lowermost compartment.

3. The combination set forth in claim 1 and in which said circumferential filter is constituted of a stiff pleated member formed of a "Teflon" coated Fiberglas membrane.

4. A combination set forth in claim 3 and in which the circumferential Fiberglas member is contained between two screen-like members which conform to the pleats of the Fiberglas membrane.

5. The combination set forth in claim 1 and in which the heating means for the vapor in the uppermost compartment is constituted of at least one isotope using radioactive material and surrounded by a plurality of outwardly extending heat radiating vanes.

6. The combination set forth in claim 5 and in which the spaces between the vanes are filled with catalytic oxidizing material which is heated by said isotope in order to accelerate the oxidizing effect.

7. The combination set forth in claim 1 and in which the means for returning the heated vapor to the lowermost compartment is constituted of a coil conduit immersed in the waste material through which the heated vapor passes.

8. The combination set forth in claim 1 and in which said circumferential filter and said flat filter in the intermediate compartment is supported by a thick layer of stainless steel wool sponge.

9. The combination set forth in claim 1 and in which the lowermost compartment can be removed at said detachable joint and a clean compartment can be substituted for the removed compartment.

10. In combination, an evaporator for obtaining potable liquid from human waste, said evaporator having four compartments A, B, C, and D, of cylindrical configuration and secured at the abutting edges to one another, cylinder D being of smaller diameter than cylinder B, cylinder C having a conical configuration which extends between cylinders B and D, cylinder A having a partial spherical shape, a joint between cylinders A and B being readily detachable whereby cylinder A can be removed from the remaining cylinders and a duplicate cylinder can be substituted therefor, means for introducing the waste material into cylinder A, means in the last-mentioned cylinder to heat said material up to a distilling temperature according to a vacuum maintained therein, a circumferential filter positioned within cylinder B and a flat filter located between the cylinders D and C, means positioned in cylinder D for heating the vapor which passes through said filter, conduit means for transporting the vapor from cylinder D to a position within cylinder A whereby the heat of the vapor is transferred through the conduit within cylinder A to the waste material, and means for condensing said vapor to a liquid remotely from the evaporator and a storage tank connected to said condenser for receiving the liquid.

References Cited

UNITED STATES PATENTS

| | | | |
|---|---|---|---|
| 2,616,839 | 11/1952 | Ames | 202—234X |
| 2,874,106 | 2/1959 | Hammon et al. | 176—39 |
| 3,026,261 | 3/1962 | Mayfield et al. | 159—24UX |
| 3,245,883 | 4/1966 | Loebel | 203—11X |
| 3,303,098 | 2/1967 | Lagowski | 203—11UX |
| 3,427,808 | 2/1969 | Butcher | 60—203X |
| 3,483,091 | 12/1969 | Metzger et al. | 202—200 |

WILBUR L. BASCOMB, JR., Primary Examiner

D. EDWARDS, Assistant Examiner

U.S. Cl. X.R.

60—203; 202—233, 234; 203—11, 100, 40